(12) United States Patent
Terada et al.

(10) Patent No.: US 6,822,009 B2
(45) Date of Patent: *Nov. 23, 2004

(54) METHOD FOR RECLAIMING WASTE CURED RESIN

(75) Inventors: Takahiko Terada, Kyoto (JP); Hiroshi Onishi, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 185 days.

This patent is subject to a terminal disclaimer.

(21) Appl. No.: 10/105,854

(22) Filed: Mar. 25, 2002

(65) Prior Publication Data

US 2002/0169222 A1 Nov. 14, 2002

(30) Foreign Application Priority Data

Mar. 23, 2001 (JP) .................................. 2001-084768

(51) Int. Cl.⁷ .............................................. C08J 11/04
(52) U.S. Cl. .......................... 521/49; 521/40; 521/40.5
(58) Field of Search ........................... 521/40, 48, 48.5, 521/49, 49.5

(56) References Cited

U.S. PATENT DOCUMENTS

| | | | | |
|---|---|---|---|---|
| 5,569,801 A | * | 10/1996 | de Broqueville | 585/241 |
| 5,668,186 A | * | 9/1997 | Brunelle et al. | 521/48 |
| 6,245,822 B1 | * | 6/2001 | Terada et al. | 521/49 |

FOREIGN PATENT DOCUMENTS

| EP | 1 085 044 | 3/2001 |
|---|---|---|
| JP | 2001-81235 | 3/2001 |

* cited by examiner

Primary Examiner—Katarzyna Wyrozebski
(74) Attorney, Agent, or Firm—RatnerPrestia (57) ABSTRACT

A method of reclaiming waste cured resins, wherein the components of a decomposition product produced by bringing waste cured resins, which have at least one type of bond selected from the group consisting of oxazolidone bond, urethane bond, amino bond and ester bond, into contact with a decomposition material which decomposes the waste cured resins has an alkenyl compound.

11 Claims, 1 Drawing Sheet

METHOD FOR RECLAIMING WASTE CURED RESIN

BACKGROUND OF THE INVENTION

1. Field of the Invention

The present invention relates to a method of reusing waste cured resins, in particular, to a method of reusing waste cured resins in which waste cured resins are treated chemically to obtain industrially valuable resin materials.

2. Related Art of the Invention

Cured resins have been widely used in not only coating applications, but also electricity, public works and adhesive applications because of their excellence in physical, chemical and electrical properties.

Thermosetting resins are cross-linked and have a three-dimensional structure when subjected to curing reaction and thereby, in general, become insoluble and non-fusible solid resins. Therefore, cured thermosetting resins are difficult to treat by decomposition, and waste cured thermosetting resins have been regarded as not suitable for reclaiming and reusing and have been disposed of.

However, as more attention has recently been paid to the waste disposal problem, the need has been increased for technological development of reusing and recycling waste cured thermosetting resins, and investigation has been started to thermally decompose the waste cured thermosetting resins and use the same as raw materials. For example, the problem of disposing of waste fiber-reinforced unsaturated polyester resins is serious because a large amount of fiber-reinforced unsaturated polyester resins has been used in manufacturing large-size products such as fishing boats, tanks, and equipment and materials for dwelling.

The problem is, however, that the advantages of cured thermosetting resins themselves, such as hardness, strength, heat resistance, fire retardance and chemical resistance, make it technically difficult to treat their wastes.

Further, thermosetting reins are often used as structural materials due to their magnitude of strength, and there are many cases where such structural materials include metallic materials. Metals are expensive compared with thermosetting resin; accordingly, reclaiming and reusing such materials are considered to be of much importance. For example, copper clad laminates and IC molds using an epoxy resin as a binder include not only paper and fiber, but also noble metals such as copper, gold and silver. In these cases, separation of metals is required as well as reclaiming thermosetting resin.

A method is known in which waste epoxy resins are ground and reused as a filler for molding compounds etc.; however, metals are difficult to separate even with this method, in addition, the fillability of ground epoxy resins are too low to reuse all of them unless they have wider applications.

Recovering and recycling waste cured resins have also been desired strongly from the viewpoint of tight waste disposal places and effective use of resources. It is, however, technically difficult to recycle waste cured resins due to their insoluble and non-fusible properties, and the actual state is that waste cured resins can hardly be recycled with currently used methods.

SUMMARY OF THE INVENTION

In light of the above problems, the object of the invention is to provide a method for easily decomposing waste cured resins and separating metals etc. therefrom, and in addition, reusing the same as raw materials.

A method of reclaiming waste cured resins according to the invention is characterized in that the components of a decomposition product produced by bringing waste cured resins, which have at least one type of bond selected from the group consisting of oxazolidone bond, urethane bond, amino bond and ester bond, into contact with a decomposition material which decomposes the above waste cured resins include an alkenyl compound.

In the method of reclaiming waste cured resins according to the invention, preferably the alkenyl compound produced as above and the resin synthesized from the alkenyl compound as a raw material contain 5% or less of the above decomposition material.

A method of reclaiming waste cured resins according to the invention is characterized in that the components of a decomposition product produced by bringing waste cured resins, which have at least one type of bond selected from the group consisting of oxazolidone bond, urethane bond and amino bond, into contact with a decomposition material which decomposes the above waste cured resins include an amino compound.

In the method of reclaiming waste cured resins according to the invention, preferably the amino compound produced as above and the resin synthesized from the amino compound as a raw material contain 5% or less of the above decomposition material.

A method of reclaiming waste cured resins according to the invention includes: a step (A) of bringing waste cured resins, which contain bisphenol A type epoxy resin as a chief material and have at least one type of bond selected from the group consisting of oxazolidone bond, urethane bond, amino bond and ester bond in their crosslinkage, into contact with a decomposition material which decomposes the above waste cured resins; a step (B) of separating and recovering the resin content insoluble in the above decomposition material subsequently after the step (A); a step (C) of subjecting the resin content separated and recovered in the step (B) to a solvolysis reaction with a solvolysis solvent so as to produce glycol or/and glycol ether.

Preferably the above solvolysis solvent is at least one selected from the group consisting of water, methanol, ethanol, ethylene glycol and propylene glycol.

Preferably the above decomposition material is a polycyclic aromatic compound with a boiling point of 200° C. or more.

Preferably the above polycyclic aromatic compound is at least one selected from the group consisting of biphenyl, alkylbiphenyl, naphthalene, methylnaphthalene, naphthalenediol, naphthol and naphthoquinone.

Preferably the above decomposition material is a hydrogen donating solvent.

Preferably the above hydrogen donating solvent is tetrahydronaphthalene, for example Tetralin®, available from DuPont.

Preferably the above decomposition material is a carbonyl compound with a boiling point of 100° C. or more.

Preferably the above carbonyl compound is at least one selected from the group consisting of methyl isobutyl ketone, isophorone, 2-hexanone, 2-heptanone, 4-heptanone, diisobutyl ketone, acetonylacetone, phorone, cyclohexanone, methylcyclohexanone and acetophenone.

In the method of reclaiming waste cured resins according to the invention, preferably the temperature at which waste cured resins are brought into contact with a decomposition material is 200 to 300° C.

DESCRIPTION OF SYMBOLS

1 . . . Liquid Phase of Decomposition Material
2 . . . Cured Resin
3 . . . Gas Phase of Decomposition Material

PREFERRED EMBODIMENTS OF THE INVENTION

The waste cured resins for which the reclaiming method of the invention is intended are those which have at least one type of bond selected from the group consisting of oxazolidone bond, urethane bond, amino bond and ester bond in their crosslinkage. The oxazolidone bond is a heterocyclic bond obtained by reacting isocyanate with an oxolane ring. The urethane bond is a bond obtained by reacting isocyanate with a hydroxyl group. And the amino bond is a bond obtained by reacting an amino group with a hydroxyl group or an oxolane ring. The ester bond is a bond obtained by reacting carboxylic acid with a hydroxyl group. The invention relates to a method of reclaiming waste cured resins which have been cured by forming one or more types of bond of these types.

The general-purpose resins having such crosslinkage include, for example, epoxy resins, polyester resins and urethane resins. The manufacturing processes and conditions of these thermosetting resins are not limited to any specific ones. The polymerization ratio of monomer components, for example, is optional.

The epoxy resins include, for example, cured resins obtained from bisphenol A type, glycidyl ether type or alicyclic epoxy and a crosslinking agent such as amine, acid, acid anhydride or isocyanate compound. From waste bisphenol A type epoxy resins, glycol and/or glycol ester can be separated and recovered by the solvolysis described later.

The polyester resins include, for example, cured resins obtained from dibasic acids such as maleic anhydride and adipic acid, dihydric alcohols such as ethylene glycol, and vinyl monomers such as styrene, hydroxyethyl acrylate and hydroxyethyl methacrylate by the conventional procedure.

The above cured resins may contain fillers, aggregates, etc. In such a case, the insolubles in the decomposition material having been separated and recovered contain fillers etc. Accordingly, such insolubles can be reused with the fillers etc. contained therein, or if the cured resin content is separated from the insolubles, the cured resin content alone can be reused.

The filler components are grouped into two categories: inorganic materials and organic materials. The inorganic materials include, for example, carbonates such as calcium carbonate and magnesium carbonate; sulfates (or sulfites) such as calcium sulfate, barium sulfate and calcium sulfite; silicates such as clay, mica, glass balloon, montmorillonite, silicic acid, kaolin and talc; oxides such as silica, diatomite, iron oxide, pumice balloon, titanium oxide and alumina; hydroxides such as aluminium hydroxide and magnesium hydroxide. They also include graphite, glass fiber, carbon fiber, asbestos fiber, etc.

On the other hand, the organic materials include, for example, wood meal, rice hull, cotton, fine pieces of paper, polyamide (nylon) fiber, polyethylene fiber, wood, pulp and cellulose.

The thickening agents include, for example, beryllium oxide, magnesium oxide, magnesium hydroxide, calcium oxide, calcium hydroxide, zinc oxide, benzoic acid, phthalic anhydride, tetrahydrophthalic anhydride and maleic anhydride.

As a lubricant, the above cured resins may contain, for example, stearic acid, zinc stearate and calcium stearate.

As a wax, the above cured resins may contain, for example, Hoechst wax, carnauba wax and paraffin wax.

As a colorant, the above cured resins may contain, for example, titanium white, chromium oxide and carbon black.

The above cured resins may be composite materials containing, as a binder, a cured resin having at least one type of bond selected from the group consisting of oxazolidone bond, urethane bond, amino bond and ester bond in its crosslinkage.

The composite materials using a polyester resin as a binder include: for example, molding compounds such as BMC (Bulk type Molding Compound) and SMC (Sheet type Molding Compound) which contain a filler, a thickening agent, a lubricant, a wax, a colorant, etc.; lining materials which contain flakes and fibers of glass, etc.; coating materials which contain a wax etc.; putties which contain a filler etc.; resin concretes which contain an aggregate, a filler, etc.; synthetic marble which contain a filler, a pigment, etc.; foams which contain a foaming agent etc.; and adhesives which contain a curing accelerator, a stabilizer, etc.

The polyester resin may be used as a bulk type molding compound, SMC or PMC (Pelletized type Molding Compound).

The reclaiming method of the invention is also intended for molded motors and molded transformers which contain metal members, such as winding wires and core materials of copper and iron.

The composite materials using an epoxy resin as a binder include: for example, the same materials that have been given as examples in the description of the composite materials using unsaturated polyester resins as a binder; and resin-bonded laminates which are laminated moldings of prepregs obtained by impregnating a base material, such as a woven or nonwoven material of a glass, polyester or aramid fiber or paper such as mica paper and linter paper, with an epoxy resin.

The resin-bonded laminates become copper clad laminates if they are laminated with copper foil with an adhesive applied on their surfaces. The resin-bonded laminates may be printed circuit boards with a conductive pattern formed and electron devices mounted on their surfaces. For example, the resin-bonded laminates may be printed wiring boards which are produced from copper clad laminates in the steps of circuit printing, etching, etc.

The composite materials using a polyurethane resin as a binder also include: for example, foams, coating materials and adhesives which contain the same additives that are mentioned in the description of the composite materials using unsaturated polyurethane resins as a binder.

The articles manufactured using the cured resins for which the reclaiming method of the invention is intended include: for example, building materials such as bathtubs, sanitary tanks, water tanks and washstands; household articles such as chairs, desks and furniture; public works materials such as tiles, synthetic marble and pipes; bodies and parts of transports such as ships, automobiles, trains and airplanes; housing equipment; decorative sheets; and ornaments.

The form and shape of the cured resins in the above manufactured articles are not limited to any specific ones. They may be used as coating materials, putties, adhesives, etc.

The articles for which the reclaiming method of the invention is intended can be manufactured by the known method for molding cured resins, such as compression molding, transfer molding and injection molding.

A decomposition material for decomposing cured resins is such that, when a resin having at least one type of bond selected from the group consisting of oxazolidone bond, urethane bond, amino bond and ester bond in its crosslinkage is heated together with the decomposition material, the material decomposes at least a part of the bond. One example of the decomposing materials suitably used in the reclaiming method of the invention is a polycyclic aromatic compound with a boiling point of 200° C. or more. As the polycyclic aromatic compound, preferably used is at least one selected from the group consisting of biphenyl, alkylbiphenyl, naphthalene, methylnaphthalene, naphthalenediol, naphthol and naphthoquinone. Further, one example of the suitable decomposing materials is a hydrogen donating solvent. Preferably tetralin is used as a hydrogen donating solvent. Further, one example of the decomposing materials suitably used in the reclaiming method of the invention is a carbonyl compound with a boiling point of 100° C. or more. As the carbonyl compound, preferably used is at least one selected from the group consisting of methyl isobutyl ketone, isophorone, 2-hexanone, 2-heptanone, 4-heptanone, diisobutyl ketone, acetonylacetone, phorone, cyclohexanone, methylcyclohexanone and acetophenone.

These decomposition materials are highly capable of decomposing oxazolidone bond, urethane bond, amino bond and ester bond, and their decomposition products are highly soluble and highly stable at high temperatures. In addition, their decomposition rarely gives off oxygen and causes the coexisting metals to be oxidized.

In the following the invention will be described according to the order of the steps for easier understanding.

First, in step (A), a cured resin for which the reclaiming method of the invention described above is intended is brought into contact with a decomposition material at 200 to 300° C., preferably. The decomposition material is a solvent capable of decomposing the cured resin. The inventors of the present invention have found, after conducting an intensive investigation, that when the above solvent, which has been heated to a prescribed temperature, is brought into contact with the above cured resin, which has crosslinkage, the crosslinkage of the cured resin is cut off.

Figure 1A:
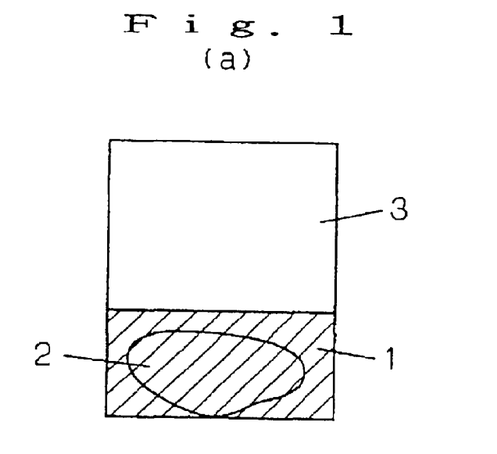
FIG. 1(a) is a schematic cross-sectional view illustrating one embodiment of the invention in which a cured resin is completely immersed in the liquid phase of a decomposition material.
Figure 1B:
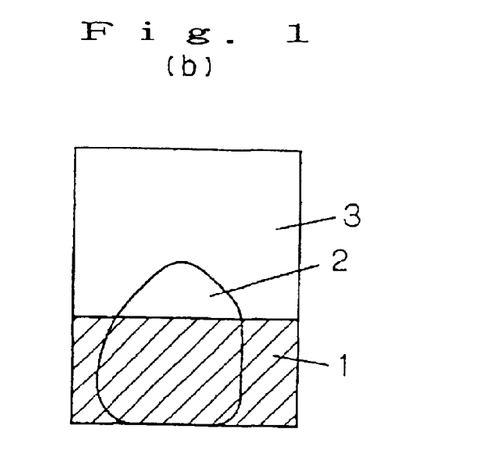
FIG. 1(b) is a schematic cross-sectional view illustrating one embodiment of the invention in which a part of cured resin is immersed in the liquid phase of a decomposition material and the rest is exposed to the gas phase of the same.
Figure 1C:
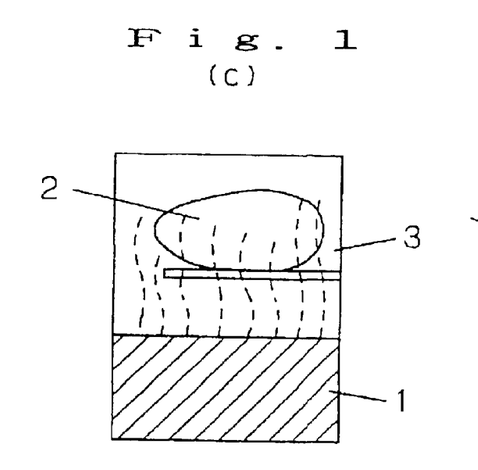
FIG. 1(c) is a schematic cross-sectional view illustrating one embodiment of the invention in which a cured resin is not immersed in the liquid phase of a decomposition material, but exposed to the gas phase of the same.
Figure 1D:
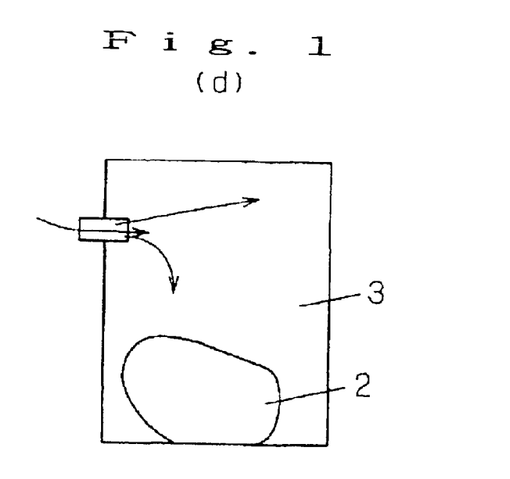
FIG. 1(d) is a schematic cross-sectional view illustrating one embodiment of the invention in which there exists only a gas-phase decomposition material and a cured resin is exposed to the gas phase of the same.

In the invention, the contact of a cured resin with a decomposition material does not necessarily mean that the cured resin is completely immersed in the liquid-phase of a decomposition material (refer to FIG. 1(a)). The cured resin may be in contact with the decomposition material in such a state that only part of it is immersed in the liquid-phase of the decomposition material and the rest is exposed to the gas-phase of the same (refer to FIG. 1(b)) or in such a state that the whole of it is exposed to the gas-phase of the decomposition material (refer to FIG. 1(c)). If there exists only a liquid-phase decomposition material, the cured resin may be in contact with the liquid-phase decomposition material alone (refer to FIG. 1(d)). Decomposition materials may exist both in a liquid phase and in a gas phase, as described above. In FIG. 1, reference numeral 1 denotes a liquid phase of a decomposition material, numeral 2 a cured resin, and numeral 3 a gas phase of the decomposition material.

The decomposition material is capable of cutting off oxazolidone bond, urethane bond, amino bond and ester bond. And if a cured resin having any one of the above types of bond is brought into contact with the decomposition material, the cured resin loses its crosslinkage portions and its three-dimensional cross-linked structure collapses. In any one of the above types of bond, a vinyl group is formed at its ends by the cut-off reaction.

In the invention, in order to obtain a high reaction rate in cutting off the crosslinkage portion, the temperature at which a cured resin is brought into contact with a decomposition material is preferably high; in actuality, the reaction rate is accelerated by leaps and bounds particularly when the temperature is 200° C. or higher. Too high a temperature, however, causes: the pressure to become too high, which requires a reactor of higher pressure resistance; the cured resin to be thermally decomposed, which makes its gaseous content high and its recovery difficult; a problem of decomposition of the decomposition material itself; and deterioration reaction, for example, oxidation of coexisting substances such as metals to be active; therefore, the temperature at which a cured resin is brought into contact with a decomposition material is preferably 300° C. or lower. Thus, the temperature at which a cured resin is brought into contact with a decomposition material is preferably 200° C. or higher and 300° C. or lower.

The alkenyl compound, which is formed by bringing a cured resin into contact with a decomposition material, is insoluble in the decomposition material at room temperature. Accordingly, the insoluble resin content can be recovered once it is separated. The separation can be carried out by conventional solid-liquid separation procedure using means such as decantation, filtration and centrifuging. The separated and recovered insoluble resin content may be washed with a solvent such as hexane.

The reclaiming method of the invention can preferably include a step of mixing the separated and recovered resin content with additional polymerizable monomers. The resin content having been mixed with additional polymerizable monomers can be provided as a thermosetting prepreg similar to a vinyl ester. And the prepreg provides a cured resin again if it is mixed with a polymerization initiator and heated.

As the additional polymerizable monomers, preferably styrene and/or hydroxyethyl methacrylate are used. These monomers are not only highly soluble in the separated and recovered resin content, but also highly copolymerizable and can form a cured resin having excellent properties.

Subsequently after mixed with the additional polymerizable monomers, the resin content can be mixed with an unsaturated polyester and/or a vinyl ester. With such esters the properties of cured resins can be controlled, and cured resins having a higher degree of crosslinking can be obtained.

Waste cured resins, which contain bisphenol A type epoxy resin as a chief material and have at least one type of bond selected from the group consisting of oxazolidone bond, urethane bond, amino bond and ester bond in their crosslinkage, are brought into contact with a decomposition material, and the resin content insoluble in the decomposition material is separated and recovered. The separated and recovered insoluble resin content has a vinyl group at its ends and ether bond in its skeleton. Then the separated and recovered resin content is subjected to a solvolysis reaction with a solvolysis solvent, to form glycol and/or glycol ether. The term "solvolysis" herein used means that solvent molecules cut off the bond in the resin content and attach to the cut-off portions of the resin content. The term has the same significance as hydrolysis.

Preferably the above solvolysis solvent is at least one selected from the group consisting of water, methanol, ethanol, ethylene glycol and propylene glycol. And the type of glycol and/or glycol ether formed differs depending on the type of the solvent.

The reclaiming method of the present invention further includes a step of synthesizing an epoxy resin by reacting the formed glycol with epichlorohydrin. Glycol and/or glycol ether can be reacted and synthesized with epichlorohydrin by conventional procedure.

The reclaiming method of the invention can further include a step of synthesizing a urethane resin by reacting the formed glycol with diisocyanate.

In the method of reclaiming waste cured resins of the invention, a waste cured resin, which has at least one type of bond selected from the group consisting of oxazolidone bond, urethane bond, and amino bond in their crosslinkage, is brought into contact with a decomposition material, to cut off the oxazolidone bond, urethane bond or amino bond; as a result, the cured resin loses its crosslinking portions and its three-dimensional cross-linked structure collapses. In any one of the above types of bond, a vinyl group is formed at its ends by the cut-off reaction and at the same time a compound is formed which has an amino group at its ends. Since the compound having an amino group at its ends is soluble in the decomposition material, if the solid matter insoluble in the decomposition material is separated from the solution of which solvent is the decomposition material, subsequently after the cured resin is brought into contact with the decomposition material, and the decomposition material is removed from its solution by distillation, the compound having an amino group at its ends, that is, the solute is purified.

In the method of reclaiming waste cured resins of the invention, an epoxy resin is obtained through a step of mixing the solute, which is obtained by removing the decomposition material by distillation, with an epoxy compound having two or more oxolane rings per molecule. The epoxy resin can be cured by heating etc.

In the method of reclaiming waste cured resins of the invention, a polyamide resin and/or a polyamide-imide resin can be obtained through a step of subjecting the solute obtained by removing the decomposition material by distillation to condensation reaction with dibasic carboxylic acid and trimellitic anhydride.

In the method of reclaiming waste cured resins of the invention, a polyimide resin can be obtained through a step of polymerizing the compound obtained by subjecting the solute, which is obtained by removing the decomposition material by distillation, to condensation reaction with maleic anhydride.

In the method of reclaiming waste cured resins according to the invention, preferably the alkenyl compound produced as above and the resin synthesized from the alkenyl compound as a raw material contain 5% or less of the above decomposition material. Or preferably the amino compound produced as above and the resin synthesized from the amino compound as a raw material contain 5% or less of the above decomposition material. Thus, detecting the decomposition material in resins by a component analysis makes it evident that the resins are reclaimed by the reclaiming method of the invention, which in turn makes easier the distinction between the reclaimed resins and the new ones as well as the process controls.

In the following the invention will be described in further detail taking several examples; however, it is to be understood that these examples are shown for illustrative purposes only and are not intended to limit the invention.

EXAMPLES 1, 2

65 parts by weight of unsaturated alkyd consisting of phthalic anhydride, fumaric anhydride and propylene glycol was mixed with 35 parts by weight of styrene. Then 0.01 parts by weight of methoxyhydroquinone, as a polymerization inhibitor, was added to the mixture and dissolved in the same by stirring at room temperature, to obtain an unsaturated polyester resin.

On the other hand, 36 parts by weight of polydipropylene adipate was mixed with 64 parts by weight of 2-hydroxyethyl methacrylate and dissolved by stirring at room temperature, to obtain a low profile additive.

26 parts by weight of low profile additive and 1 part by weight of 1,1-(t-butylperoxy)3,3,5-trimethylcyclohexane as a polymerization initiator were added to 74 parts by weight of the above unsaturated polyester resin, and the mixture was mixed by stirring, to obtain a liquid resin composition.

Then 17.8 parts by weight of calcium carbonate as a filler, 48.5 parts by weight of aluminium hydroxide, 1.5 parts by weight of zinc stearate as a lubricant and 0.4 parts by weight of carbon powder as a colorant were taken into a kneader and subjected to dry mixing for about 5 minutes.

A uniformly mixed dry mixing product was obtained, and 22 parts by weight of previously prepared resin composition was added thereto slowly and kneaded, to obtain a uniform pasty mixture.

Then 9.8 parts by weight of glass fiber was added to the pasty mixture in as short a period of time as possible in such a manner as to dispersing the glass fiber evenly in the mixture, and when the glass fiber got wet and uniformly dispersed, the kneading was stopped, to obtain a molding compound with a thermosetting resin as a binder.

The molding compound obtained in the above manner is a bulk type molding compound commonly called BMC and exhibits non-tackiness, though it contains a solvent.

The molding compound was compression molded at a mold temperature of 150° C. and a pressure of 35 kgf/cm$^2$, to obtain a cylindrical cured thermosetting resin 20 mm in diameter.

Then the product was immersed in a decomposition material consisting of tetralin alone at 280° C. for 3 hours. It was observed that the decomposition material permeated the inside of the cured resin, the cured unsaturated polyester resin was so chemically decomposed that it became unable to keep its structure and collapsed. The solid matter insoluble in tetralin underwent solid-liquid separation by filtration, the separated solid matter was immersed in styrene, and the insolubles were removed to separate styrene solution alone.

Styrene was further added to the styrene solution to give a styrene content of 35%, to obtain a prepreg of additional polymerizable thermosetting resin (Example 1).

An unsaturated alkyd consisting of phthalic anhydride, fumaric anhydride and propylene glycol as well as styrene were added to the styrene solution, to obtain a prepreg of additional polymerizable thermosetting resin (Example 2).

When one part by weight of 1,1-(t-butylperoxy)3,3,5-trimethylcyclohexane as a polymerization initiator was added to 100 parts by weight of the respective prepregs and each mixture was heated to 150° C., curing reaction took place and the prepregs could be molded.

Thus, prepregs of additional polymerizable thermosetting resin could be obtained again from the cured unsaturated polyester resin, which was a cured resin having ester bond.

In these examples, tetralin was used as a decomposition material for decomposing cured resins having at least one type of bond selected from the group consisting of oxazolidone bond, urethane bond, amino bond and ester bond in their crosslinkage; however, other decomposition materials such as cyclohexane can also be used. And the blend ratio of cured resin to decomposition material and the contact method are not limited to those described in these examples.

Although the invention has been described using a bulk type molding compound in these examples, a sheet type molding compound SMC and a palletized type molding compound PMC may also be used. This is applicable to all the examples described later. And it goes without saying that the blend ratio, composition and molding conditions of unsaturated polyester resins and polymerization initiators are not limited to those described in these examples.

As solid-liquid separating means, filtration using filters, centrifuging, etc. can be used. For centrifuging, centrifugal separators of, for example, cylindrical type, disk type and decanter type can be used.

EXAMPLES 3–8

In these examples, a laminate, which is a manufactured article using an epoxy resin as a binder, was treated by decomposition. An epoxy resin consisting of the mixture of bisphenol A type epoxy, diphenylmethanediisocyanate, acetone and methyl isobutyl ketone was impregnated into woven glass fiber, and the solvent was evaporated by heating to produce a prepreg. The prepreg was cut into a required number of sheets which were superposed on each other, copper foil with a modified epoxy resin adhesive applied thereon was placed on the prepreg, and the prepreg with copper foil was inserted into a press and cured by heating and pressing, to obtain a copper clad laminate. The epoxy resin used as a binder of the product was a cured resin having oxazolidone bond and urethane bond in its crosslinkage.

Then the above laminate was immersed in tetralin and heated at 260° C. for 5 hours. As a result, the resin as a binder was decomposed, and dissolved or dispersed in the decomposition solution, and left was the kraft paper and the woven glass fiber, which were used as bases of the laminate, and copper foil. The woven glass fiber left was in such a state that it was easily separated into the same number of sheets as those having been superposed in the laminate producing step. Thus, the laminate, which was a cured resin produced using a thermosetting resin, in particular, an epoxy resin as a binder, could be quickly treated by decomposition with a decomposition material consisting of tetralin.

The decomposition material after the decomposition treatment was subjected to solid-liquid separation by filtration, to obtain a tetralin solution and solid matter insoluble in tetralin. The separated solid matter was then immersed in styrene, and the insolubles in styrene were removed to separate a styrene solution alone. The insolubles having been removed when immersing the solid matter in styrene were copper foil and glass fiber. When analyzing the structure of the solid matter dissolved in styrene, the structure was such that the oxolane rings at the ends of bisphenol A type epoxy, as a chief ingredient, were replaced with vinyl groups. Styrene was further added to the styrene solution to give a styrene content of 35%, to obtain a prepreg of additional polymerizable thermosetting resin (Example 3). Further, hydroxyethyl methacrylate and bisphenol A type vinyl ester were added to the above prepreg, to obtain a prepreg of additional polymerizable thermosetting resin (Example 4).

When one part by weight of t-butyl peroxy benzoate as a polymerization initiator was added to 100 parts by weight of the respective prepregs and each mixture was heated to 120° C., curing reaction took place and the prepregs could be molded.

Thus, prepregs of additional polymerizable thermosetting resin could be obtained again from the cured epoxy resin, which was a cured resin having oxazolidone bond and urethane bond.

Further, tetralin was separated by distillation from the above tetralin solution, which was obtained by the solid-liquid separation, to obtain solid matter (Example 5). When analyzing the solid matter by the infrared spectroscopy, IR, and nuclear magnetic resonance spectroscopy, NMR, it was found that the solid matter was methanedianiline. Thus, an amine originated from a cured resin crosslinking agent could be obtained by bringing the cured resin having oxazolidone bond and urethane bond in its crosslinkage into contact with tetralin at 260° C. and then removing tetralin by distillation from the tetralin solution from which insolubles have been separated.

Further, the solid matter obtained by separating tetralin from the above tetralin solution by distillation was mixed with diglycidyl ether of bisphenol A, which is an epoxy compound having two or more oxolane rings per molecule, to obtain a prepreg (Example 6). When injecting the prepreg into a mold and heating the same to 150° C., a sheet like molded product was obtained within 10 minutes. The analyses revealed that the molded product had a three dimensionally crosslinked structure formed by amine bond and urethane bond. And measurements of the strength, heat resistance and specific volume resistance showed that the molded product had the properties equivalent to those of a general-purpose epoxy resin. Thus, an epoxy resin prepreg could be obtained only by mixing the solid matter obtained by separating tetralin from the tetralin solution by distillation with an epoxy compound having two or more oxolane rings per molecule.

The epoxy compound having two or more oxolane rings per molecule is not limited to diglycidyl ether of bisphenol A shown in the examples. Other epoxy compounds such as bisphenol A type epoxy, alicyclic epoxy and cresol type epoxy may also be used.

When subjecting the solid matter obtained by separating tetralin from the tetralin solution by distillation and trimellitic anhydride to condensation reaction, polymerization took place and a resin was obtained (Example 7). Analyses of the molded product of the resin revealed that the polymerization took place while forming amide bond. A molded product was formed by injection molding the resin and various properties of the molded product were measured. The measurements showed that the molded product provided heat resistance of 260° C., high tensile strength and high flexural strength. It was also revealed that the molded product was excellent in electrical properties such as specific volume resistance, dielectric dissipation factor and breakdown strength. Thus, a resin having properties equivalent to those of the commercially available polyimide could be obtained only by subjecting the solid matter obtained by separating tetralin from the tetralin solution by distillation and trimellitic anhydride to condensation reaction.

The invention has been described taking examples in which trimellitic anhydride is used; however, trimellitic acid, dodecanoic diacidic salt, dibasic carboxylic acids such as adipic acid and sebacic acid, pyromellitic acid, and the anhydrides thereof can also be used.

When polymerizing the compound, which was obtained by subjecting the solid matter obtained by separating tetralin from the tetralin solution by distillation and maleic anhydride to condensation, with the solid matter obtained by separating tetralin from the tetralin solution by distillation at 180° C., a curable resin was obtained (Example 8). The measurements of the properties revealed that the resin had class H heat resistance and cryogenic properties, with which it did not change even at cryogenic temperatures, and was excellent in dimensional stability and moldability.

In these examples, the compound obtained by condensing maleic anhydride was further polymerized with the solid matter obtained by separating tetralin from the tetralin solution by distillation; however, the compound can be polymerized with such compounds as have two or more active hydrogens, such as diamines and polyamines.

In these examples, an epoxy resin, which was a cured resin with its crosslinked portion formed by oxazolidone bond and urethane bond, was shown as what the reclaiming method of the invention is intended for; however, the reclaiming method of the invention is intended for any cured resins as long as they have at least one type of bond selected from the group consisting of oxazolidone bond, urethane bond, amino bond and ester bond in their crosslinkage.

In these examples, tetralin was used as a decomposition material for decomposing cured resins which had at least one type of bond selected from the group consisting of oxazolidone bond, urethane bond, amino bond and ester bond in their crosslinkage; however, other decomposition materials such as cyclohexane can also be used. And the blend ratio of cured resin to decomposition material and the contact method are not limited to those described in these examples.

And it goes without saying that the blend ratio, composition, and molding and synthesizing conditions of cured resins and decomposition materials are not limited to those described in these examples.

In the step (B), the insoluble solid content to be separated can be separated by dissolution into a resin product and the others, such as metal parts contained in manufactured articles and inorganic fillers. In these examples, copper foil, glass fiber, etc. can be separated and reused. In the separation by dissolution, the separated solid matter can be dissolved in at least one selected from the group consisting of acetone, acetylacetone, acetaldehyde, ethyl acetoacetate, methyl acetoacetate, methyl ethyl ketone, diethyl ketone, methyl isobutyl ketone, methyl isopropyl ketone, dimethyl sulfoxide, dimethylformamide, ethyl acetate, isopropyl acetate, butyl acetate, tetrahydrofuran, dioxane, diethyl ether, water, ethanol, methanol, methyl cellosolve and ethyl cellosolve.

Solid-liquid separating means is not limited to separation by dissolution, and filtration using filters, centrifuging, etc. can be used as solid-liquid separating means. For centrifuging, centrifugal separators of, for example, cylindrical type, disk type and decanter type can be used.

In these examples, the reclaiming method of the invention has been described taking an example of manufactured articles containing cured resins, which have at least one type of bond selected from the group consisting of oxazolidone bond, urethane bond, amino bond and ester bond in their crosslinkage, as a binder; however, it goes without saying that cured resins alone can be reclaimed in the same manner as these examples.

EXAMPLE 9

In this example, a laminate, which is a manufactured article using an epoxy resin as a binder, was treated by decomposition. An epoxy resin consisting of the mixture of bisphenol A type epoxy, methanedianiline, acetone and methyl isobutyl ketone was cured at 160° C. under pressure, to obtain a sheet molded product. The epoxy resin used as a binder of the article was a cured resin having crosslinking portions formed by amino bond and urethane bond.

Then the above laminate was immersed in tetralin and heated at 220° C. for 5 hours. As a result, the resin as a binder was decomposed, and dissolved or dispersed in the decomposition solution.

Thus, an epoxy resin, which is a thermosetting resin, could be quickly treated by decomposition with a decomposition material consisting of tetralin. The decomposition material after the decomposition treatment was subjected to solid-liquid separation by filtration, to obtain a tetralin solution and solid matter insoluble in tetralin. Then sodium hydroxide and ethylene glycol, as a solvolysis solvent, were added to the solid matter insoluble in tetralin and heated to 180° C., as a result of which the solid matter was decomposed and the solution was homogenized. The analyses of the solution revealed that the solid matter underwent solvolysis, and compounds, including bisphenol A, ether of bisphenol A and glycol and ethylene glycol as a solvent, which have hydroxyl groups at their respective ends alone could be recovered (Example 9).

Thus, glycol component could be obtained again from the cured epoxy resin, which was a cured resin having amino bond and urethane bond, as a raw material.

In this example, ethylene glycol was used as a solvolysis solvent; however, propylene glycol and water may also be used.

Methanol or ethanol may also be used as a solvolysis solvent; however, when using these solvents, glycol component must be separated from the solvolysis product by, for example, fractional distillation.

The catalyst used in the solvolysis is not limited to sodium hydroxide, and alkaline metals such as potassium hydroxide, alkaline earth metals such as calcium hydroxide and metal alkoxides can also be used. And the solvolysis does not always require a catalyst.

When adding calcium oxide as a catalyst, the calcium oxide having not been consumed by reaction can be neutralized with carbon dioxide. For example, if the calcium oxide left insoluble is put into a solvent and carbon dioxide is blown into the solvent while stirring the same, the calcium oxide can be easily neutralized to be calcium carbonate. The calcium carbonate having been formed can be reused as an inorganic filler after being separated by dissolution. The neutralization can be carried out if only carbon dioxide is present, and carbon dioxide may be introduced in such a manner as to blow a gas containing carbon dioxide, air or exhaust gas from a boiler into the solvent or in such a manner as to directly put dry ice into the solvent.

Epichlorohydrin and sodium hydroxide as a catalyst were added to the above described compounds having hydroxyl groups at their ends and the mixture was heated to 100° C. As a result, a resin 2000 in average molecular weight and having oxolane rings at its ends could be obtained (Example 10). Thus, an epoxy resin could be obtained again from the cured epoxy resin, which was a cured resin having amino bond and urethane bond, as a raw material.

100 parts by weight of the above resin and 4 parts by weight of dicyanodiamide were dissolved in a mixed solvent of acetone/methyl cellosolve, and then the solution was filled into a mold and predried in a vacuum at 100° C., to remove the solvent. After 5 minutes heating at 160° C., a sheet molded product could be obtained.

When mixing the compounds having hydroxyl groups at their ends with hexamethylenediisocyanate, a reaction took place even at room temperature and a polymerization product was obtained (Example 11). Analyses revealed that the polymerization product had urethane bond, it was highly elastic, tough and abrasion-resistant, and that it was excellent in insulation resistance and arc resistance. They had properties equivalent to those of the commercially available urethane resins.

Thus, a urethane resin could be obtained again from the cured epoxy resin, which was a cured resin having amino bond and urethane bond, as a raw material.

In this example, the condensation was carried out with hexamethylenediisocyanate; however, diisocyanate may also be used for the condensation.

In this example, an epoxy resin, which was a cured resin with its crosslinked portion formed by urethane bond and amino bond, was shown as what the reclaiming method of the invention is intended for; however, the reclaiming method of the invention is intended for any cured resins as long as they have at least one type of bond selected from the group consisting of oxazolidone bond, urethane bond, amino bond and ester bond in their crosslinkage.

In this example, tetralin was used as a decomposition material for decomposing cured resins which had at least one type of bond selected from the group consisting of oxazolidone bond, urethane bond, amino bond and ester bond in their crosslinkage; however, other decomposition materials such as cyclohexane can also be used. And the blend ratio of cured resin to decomposition material and the contact method are not limited to those described in this example.

And it goes without saying that the blend ratio, composition, and molding and synthesizing conditions of cured resins and decomposition materials are not limited to those described in this example.

In this example, the reclaiming method of the invention has been described taking an example of cured resins having at least one type of bond selected from the group consisting of oxazolidone bond, urethane bond, amino bond and ester bond in their crosslinkage; however, it goes without saying that manufactured articles containing such cured resins as a binder can also be reclaimed in the same manner as this example.

The above described decomposition solvents are highly stable at high temperatures, and in addition, they rarely produce oxygen when they themselves are decomposed and rarely induce oxidation of metals contained in cured resins; therefore, in any of the examples described so far, a pretreatment step of removing oxygen is not necessarily required. However, in order to raise the yield of product with the decomposition materials, or when only slight oxidation of metals contained in cured resins becomes a problem, or in order to increase the life of the decomposition materials, a pretreatment step of removing oxygen can be provided.

In other words, before the step (A), preferably a step (A') is provided of removing oxygen from the atmosphere where a cured resin and a decomposition material are brought into contact with each other.

The step (A') can be carried out by conventional procedure. One procedure, for example, may be such that a gas introducing pipe and an exhaust valve are provided for a decomposition tank in which a cured resin and a decomposition material have been prepared and a nitrogen gas is directly supplied thereto from a nitrogen gas bomb.

The gas in the decomposition tank may also be exhausted under reduced pressure. Pressure can be reduced if an exhausted valve is provided and a vacuum pump is installed in the decomposition tank in which a cured resin and a decomposition material have been prepared. Desirably the reduced pressure is as close to vacuum as possible. Preferably the pressure is 10 mmHg or lower.

In any of the above procedures, removal of oxygen can become more effective if the decomposition materials are stirred or heated moderately.

Preferably both of the above procedures are employed. Although any procedure can be used as long as oxygen can be exhausted from the atmosphere where a cured resin and a decomposition material are brought into contact with each other, one desirable procedure is, for example, such that the gas in the decomposition tank is replaced with a nitrogen gas and then the nitrogen gas is exhausted and thereby the pressure in the decomposition tank is reduced. Conducting the decomposition treatment after the pretreatment for removing oxygen is conducted prevents the decomposition material from being oxidized, which is a main cause of the deterioration of the decomposition liquid during a high temperature reaction treatment; increases the life of the decomposition liquid; and improves the usability of the decomposition liquid even after the repeated use. Further, it can prevent the metals contained in the cured resins from being oxidized and deteriorating and can stabilize and improve the quality of the products separated and recovered from the liquid.

In the invention described so far, the decomposition solvents obtained by separating solutes from decomposition material solutions can be reused in the same applications.

As described so far, the method of reclaiming waste cured resins according to the invention allows cured resins, which have at least one type of bond selected from the group consisting of oxazolidone bond, urethane bond, amino bond and ester bond in their crosslinkage, to be easily decomposed and reused as resin materials; accordingly, the use of the method promotes reuse of used cured resins, decreases the amount of wastes disposed of, and contributes to effective use of resources.

What is claimed is:

1. A method for reclaiming a cured resin, said cured resin having at least one type of bond selected from the group consisting of oxazolidone bond, urethane bond, amino bond and ester bond, comprising:

a step of contacting said cured resin with a decomposition material which decomposes said cured resin, to provide a decomposition product comprising an alkenyl compound.

2. A method of reclaiming waste cured resins comprising: a step (A) of bringing waste cured resins, which contain bisphenol A type epoxy resin as a chief material and have at least one type of bond selected from the group consisting of oxazolidone bond, urethane bond, amino bond and ester bond in their crosslinkage, into contact with a decomposition material which decomposes the waste cured resins; a step (B) of separating and recovering the resin content insoluble in the above decomposition material subsequently after the step (A); and a step (C) of subjecting the resin content separated and recovered In the step (B) to a solvolysis reaction with a solvolysis solvent so as to produce glycol or/and glycol ether.

3. The method of reclaiming waste cured resins according to claim 2, wherein the solvolysis solvent is at least one selected from the group consisting of water, methanol, ethanol, ethylene glycol and propylene glycol.

4. The method of reclaiming waste cured resins according to claim 1 or 2, wherein the decomposition material is a polycyclic aromatic compound with a boiling point of 200° C. or more.

5. The method of reclaiming waste cured resins according to claim 4, wherein the decomposition material is at least one selected from the group consisting of biphenyl, alkylbiphenyl, naphthalene, methylnaphthalene, naphthalenediol naphthol and naphthoquinone.

6. The method of reclaiming waste cured resins according to claim 1 or 2, wherein the decomposition material is a hydrogen donating solvent.

7. The method of reclaiming waste cured resins according to claim 6, wherein the decomposition material is tetrahydronaphthalene.

8. The method of reclaiming waste cured resins according to claim 1 or 2, wherein the decomposition material is a carbonyl compound with a boiling point of 100° C. or more.

9. The method of reclaiming waste cured resin according to claim 8, wherein the decomposition material is at least one selected from the group consisting of methyl isobutyl ketone, isophorone, 2-hexanone, 2-heptanone, 4-heptanone, diisobutyl ketone, acetonylacetone, phorone, cyclohexanone, methylcyclohexanone and acetophenone.

10. The method of reclaiming waste cured resin according to claim 1, wherein the produced alkenyl compound and the resin synthesized from the alkenyl compound as a raw material contain 5% or less of the decomposition material.

11. The method of reclaiming waste cured resins according to claim 1 or 2, wherein the temperature at which waste cured resins are brought into contact with a decomposition material is 200 to 300°C.

* * * * *

UNITED STATES PATENT AND TRADEMARK OFFICE
CERTIFICATE OF CORRECTION

PATENT NO. : 6,822,009 B2
DATED : November 23, 2004
INVENTOR(S) : Takahiko Terada et al.

It is certified that error appears in the above-identified patent and that said Letters Patent is hereby corrected as shown below:

Title page,
Item [56], References Cited, U.S. PATENT DOCUMENTS, insert
-- 6,465,531 10/2002 Thai et al.
  6,489,373 12/2002 Kodama et al. --

Column 15,
Line 20, "In" should read -- in --.

Signed and Sealed this

Fifth Day of July, 2005

JON W. DUDAS
*Director of the United States Patent and Trademark Office*